US012807138B1

(12) United States Patent
Kularatne et al.

(10) Patent No.: US 12,807,138 B1
(45) Date of Patent: Nov. 24, 2026

(54) DETERMINING VEHICLE TRAJECTORIES BASED ON SIGNAL-RELATED COSTS

(71) Applicant: Zoox, Inc., Foster City, CA (US)

(72) Inventors: Dhanushka Nirmevan Kularatne, Castro Valley, CA (US); Shohin Mukherjee, San Mateo, CA (US); Jack Riley, San Francisco, CA (US); Mazen Alim Siddiqui, San Francisco, CA (US); Olivier Amaury Toupet, Escondido, CA (US)

(73) Assignee: Zoox, Inc., Foster City, CA (US)

( * ) Notice: Subject to any disclaimer, the term of this patent is extended or adjusted under 35 U.S.C. 154(b) by 101 days.

(21) Appl. No.: 18/790,699

(22) Filed: Jul. 31, 2024

(51) Int. Cl.

| | |
|---|---|
| ***B60W 30/09*** | (2012.01) |
| ***B60Q 1/34*** | (2006.01) |
| ***B60W 60/00*** | (2020.01) |
| ***G05D 1/43*** | (2024.01) |
| ***G06V 20/58*** | (2022.01) |

(52) U.S. Cl.
CPC ............ *B60W 30/09* (2013.01); *B60Q 1/346* (2013.01); *B60W 60/0011* (2020.02); *G05D 1/43* (2024.01); *G06V 20/58* (2022.01)

(58) Field of Classification Search
CPC ... B60W 30/09; B60W 60/0011; B60Q 1/346; G05D 1/43; G06V 20/58
See application file for complete search history.

(56) References Cited

U.S. PATENT DOCUMENTS

| | | | | |
|---|---|---|---|---|
| 12,131,645 | B1 * | 10/2024 | Zhang | G08G 1/167 |
| 2016/0003620 | A1 * | 1/2016 | Kapoor | G08G 1/096844 701/400 |
| 2021/0129834 | A1 * | 5/2021 | Gier | B60W 30/0956 |
| 2021/0366284 | A1 * | 11/2021 | Yen | G08G 1/0133 |
| 2023/0097121 | A1 * | 3/2023 | Schwartz | G06N 5/01 701/26 |
| 2023/0162539 | A1 * | 5/2023 | Li | B60W 50/06 701/23 |
| 2024/0017743 | A1 * | 1/2024 | Farid | B60W 30/09 |
| 2025/0058799 | A1 * | 2/2025 | Inaba | B60W 30/0956 |

* cited by examiner

*Primary Examiner* — Abby Lin
*Assistant Examiner* — Danielle M Jackson
(74) *Attorney, Agent, or Firm* — Lee & Hayes, P.C.

(57) ABSTRACT

Upon determination of certain events, such as a blockage of a lane or where a lane ends, a blinker of a vehicle driving in the lane may be proactively actuated in order to inform surrounding traffic the intent of the vehicle to change lanes in advance of the blockage. Additional costs based on the activation of the blinker may be determined to inform a driving behavior of the vehicle in response to the activation.

20 Claims, 5 Drawing Sheets

DETERMINING VEHICLE TRAJECTORIES BASED ON SIGNAL-RELATED COSTS

BACKGROUND

Autonomous and semi-autonomous vehicles are becoming increasingly prevalent worldwide. These vehicles are equipped with sensor systems and computing devices that enable them to navigate through their environment and make driving decisions. However, the decision-making processes employed by autonomous and semi-autonomous vehicles can sometimes result in behavior that is unexpected and/or unnatural to human drivers and pedestrians.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
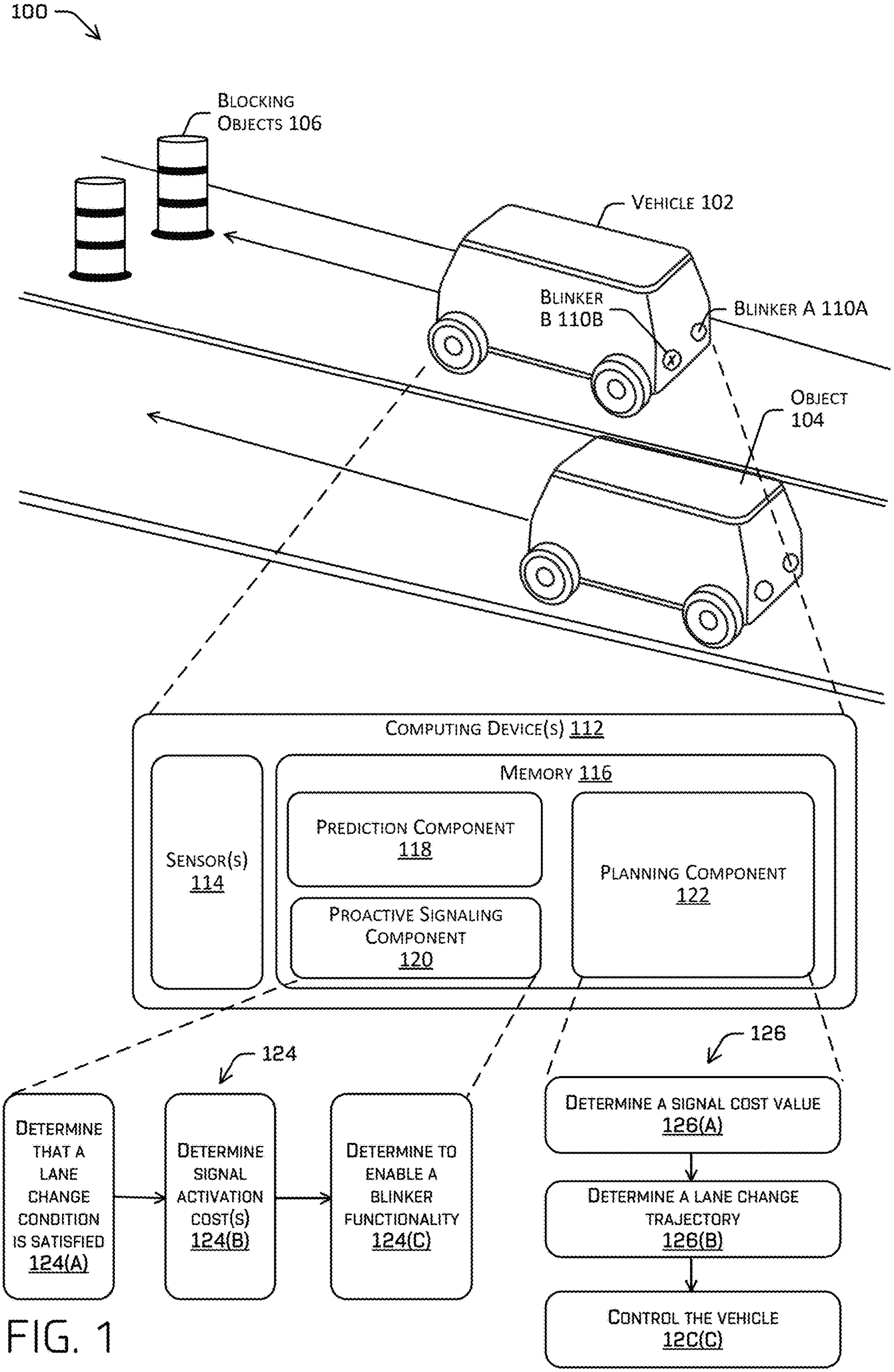
FIG. 1 provides an example environment that may enable determining whether to perform a lane change maneuver and/or activate a blinker functionality associated with a lane change maneuver.

This disclosure describes techniques for determining: (i) when to perform a movement (e.g., a lateral movement, such as a lateral movement associated with a lane change maneuver) by a vehicle (e.g., an autonomous and/or semiautonomous vehicle) and/or (ii) whether to activate, prior to determining a vehicle trajectory that includes (e.g., begins with) a lane, a vehicle signaling functionality (e.g., a left-turn and/or right-turn blinker functionality) configured to signal an intention to perform a movement (e.g., a lane change maneuver). For example, in some cases, the techniques described herein relate to determining: (i) when to perform a lane change mauver (e.g., a right lane change maneuver and/or a left lane change maneuver) by a vehicle, and/or (ii) when to activate a blinker functionality to signal an intention to perform the lane change maneuver. However, while various implementations of the present techniques are described in the context of determinations related to lane change maneuvers and/or blinker activations, a person of ordinary skill in the relevant technology will recognize that the present techniques may be extended to determinations related to any vehicle movements and/or any vehicle functionality configured to signal an intention to perform a lateral movement.

In at least some examples, determining to provide an indication of a change in lateral position may be based on whether the resultant output trajectory includes a lane change (or other lateral deviation). In such examples, the blinker determination may be made based on the resultant trajectory. In other examples, however, it may be beneficial to determine to activate a blinker well in advance of changing a lateral state (such as when the current lane is blocked (e.g., by an object such as a vehicle, a merge operations, etc.) so as to provide other vehicles information about the intent of the autonomous vehicle, also referred to herein as a proactive blinker. In response, other vehicles may be more inclined to provide space to the autonomous vehicle whereas it would otherwise be precluded from changing lanes.

In some cases, an example system may be configured to determine whether to perform a lane change maneuver (or other vehicle movement) based on a "signal timing cost." The signal timing cost may represent whether and/or how long the vehicle's blinker functionality (or other movement signal functionality) has indicated an intention to perform the lane change maneuver (e.g., prior to performing a lane change maneuver in accordance with a lane change trajectory being evaluated). In some cases, the signal timing cost may penalize adoption of a trajectory including a lane change when the blinker functionality has not been activated for a threshold period of time. However, in some cases, even when the signal timing cost is high (e.g., the blinker functionality has not been activated for a threshold period of time), other cost terms (e.g., safety cost, path deviation cost, and/or the like) associated with a lane change trajectory may be low, and this may cause adoption of the lane change trajectory despite a high signal timing cost value.

In some cases, the signal timing cost is determined based on a length of time associated with the blinker activation (e.g., prior to performing the lane change in accordance with the trajectory being evaluated). For example, in some cases, the signal timing cost may have one range (e.g., a higher value, such as a positive value) if the blinker has been active for less than a threshold period of time, and a second range (e.g., a lower value, such as a zero value) if the blinker has been active for equal to or more than the threshold period. In some cases, the signal timing cost may be the output of a function (e.g., a step function) that has a first value (e.g., a value of one) before the threshold period expiration and a second value (e.g., a value of zero) at and after the threshold period expiration. In some cases, the signal timing cost may be the output of a function that decreases monotonically before the threshold period expiration and then equals and/or converges to zero after the threshold period expiration. In some cases, the signal timing cost may be determined based on the function signal_cost=max(0, threshold_time−blinker_active_time), where signal_cost is the signal timing cost value, threshold_time is the threshold time period, and blinker_active_time is the current duration of blinker activation. In some cases, the signal timing cost is determined based on the output of an exponential decay function (e.g., an exponential decay function expressed as a function of a length of time associated with blinker activation).

In some cases, the signal timing cost is configured to penalize the adoption of a trajectory including a lane change maneuver in situations in which a blinker associated with the maneuver has not been activated for the threshold period and/or reward the adoption of a trajectory including a lane change maneuver when a corresponding blinker has been activated for a threshold period. For example, before a left lane change blinker has been activated for a threshold period, the signal timing cost may penalize adoption of a trajectory that includes a left change maneuver. However, after the left lane change blinker has been activated for the threshold period, the signal timing cost value may decrease, and this decrease may enable (or increase a likelihood of) adoption of a trajectory that includes a left lane change maneuver.

In some cases, the system conditionally uses a signal timing cost value in trajectory determination. For example, in some cases, the system uses a signal timing cost value based on determining that a condition for a lane change maneuver (e.g., a left-turn and/or right-turn lane change maneuver) is satisfied. Examples of lane change maneuver conditions include: (i) a condition that is satisfied when the system detects that a current lane associated with a vehicle includes a blocking object (e.g., a static object and/or a stationary non-dynamic object), (ii) a condition that is satisfied when the system detects that a current lane associated with a vehicle is ending, (iii) a condition that is satisfied when the system detects that a current lane associated with a vehicle is merging with one or more other lanes, (iv) a condition that is satisfied when the system detects that a current lane associated with a vehicle is slower than an adjacent lane (e.g., that a difference between a velocity associated with the current lane and a velocity associated with an adjacent lane exceeds a threshold), (v) a condition that is satisfied when the system detects that a planned route requires a lane change (e.g., to exit and/or merge onto a different road), and/or (vi) a condition that is satisfied when the system detects that one or more traffic laws and/or road signs require a lane change. A blocking object may include any object that is detected to be static and/or stationary, and/or any object whose detected velocity is below a threshold (e.g., whose detected velocity is zero).

Accordingly, in some cases, the system determines whether to adopt a trajectory that includes a lane change maneuver based on a length of time that a corresponding blinker has been activated (e.g., based on whether the corresponding blinker has been activated for a threshold period). In some cases, the system further includes a proactive signaling functionality that is configured to determine when to activate a blinker in anticipation of a lane change maneuver. For example, in some cases, the system predicts that the vehicle is expected to make a lane change maneuver and activates the corresponding blinker functionality based on that prediction.

In some cases, at time T1, the system may detect that a blinker functionality associated with a lane change maneuver has not been activated and/or has not been activated for a threshold period. Based on this detection, the system may determine a first signal timing cost value (e.g., a higher signal timing cost value) with respect to a first trajectory that includes the lane change maneuver. Based on the first signal timing cost value, the system may reject the first trajectory. However, the system (e.g., the system's proactive signal functionality) may nevertheless activate the blinker functionality at time T1 (e.g., based on determining that a current lane includes a blocking object and/or ends within a threshold distance). Based on this determination and the subsequent activation of the blinker functionality, the system may, at time T2 after T1, detect that a blinker functionality associated with a lane change maneuver has been activated and/or has been activated for a threshold period. Based on this detection, the system may determine a second signal timing cost value (e.g., a lower signal timing cost value) with respect to a second trajectory that includes the lane change maneuver. Based on the second signal timing cost value, the system may adopt the second trajectory.

Accordingly, in some cases, the techniques described herein include a proactive signaling functionality that is configured to determine whether to active a blinker functionality (e.g., or other vehicle signaling functionality) to signal an intention to perform a lane change maneuver (e.g., or other vehicle movement). For example, the proactive signaling functionality may be configured to determine to determine whether to active a blinker functionality (e.g., or other vehicle signaling functionality) to signal an intention to perform a lane change maneuver (e.g., or other vehicle movement) prior to controlling the vehicle in accordance with a trajectory that includes the lane change maneuver. In contrast, another signaling functionality may be configured to activate a blinker functionality (e.g., or other vehicle signaling functionality) to signal an intention to perform a lane change maneuver (e.g., or other vehicle movement) based on (e.g., as part of, in response to, and/or the like) controlling the vehicle in accordance with a trajectory that includes the lane change maneuver. In some cases, the proactive signaling functionality operates independently of and/or in parallel with the trajectory determination functionality, such that the system may, during the same time: (i) determine (e.g., using the trajectory determination functionality) to reject a trajectory including a lane change maneuver, and (ii) determine (e.g., using the proactive signaling functionality) to activate a blinker associated with the lane change maneuver (e.g., based on determining that the lane change maneuver will be required in subsequent times). In some cases, the system determines whether to activate the blinker functionality based at least in part on a subset of costs used to determine a trajectory for the vehicle.

In some cases, to determine whether to activate a blinker functionality prior to controlling a vehicle in accordance with a lane change trajectory, the system is configured to: (i) detect that a condition that may trigger a lane change maneuver is satisfied, (ii) determine a set of costs associated with determining whether to activate a blinker functionality, (iii) determine, based at least in part on the set of costs, which blinker functionality to activate (e.g., whether to activate the left and/or the right blinker functionality), and/or (iv) based on (e.g., in response to) determining which the blinker functionality to activate, activate that blinker functionality and/or cause that blinker functionality to be activated.

In some cases, the system may detect that a condition that may trigger a lane change maneuver is satisfied. For example, in some cases, the proactive signaling functionality may only be activated when at least one condition that may trigger a lane change maneuver is satisfied. Examples of such triggering conditions include: (i) a condition that is satisfied when a vehicle's current lane includes a blocking object (e.g., a stopped vehicle, a slow-moving vehicle, a bicyclist, a pedestrian, and/or the like), (ii) a condition that is satisfied when a vehicle's current lane is determined to be ending (e.g., merging with another lane, exiting into another road, and/or the like) within a threshold distance, (iii) a condition that is satisfied when the determined difference between a moving speed associated with the vehicle's current lane and another lane (e.g., an adjacent lane) is determined to exceed a threshold, (iv) a condition that is satisfied when determining that the vehicle's current path and/or trajectory requires a lane change, (v) a condition that is satisfied when the vehicle's current path and/or trajectory requires going straight and the vehicle's current lane is changing into a turn-only lane within a threshold distance, and (vi) a condition that is satisfied when determining that one or more traffic laws and/or road signs require a lane change (e.g., when detecting a signs indicating a merge and/or a lane ending).

In some cases, to determine whether a condition that may trigger a lane change maneuver is satisfied (e.g., to determine whether to active the proactive signaling functionality), the system may use at least one of sensor data (e.g., image data captured using one or more cameras, lidar data, radar data, and/or the like), map data, geolocation data (e.g., global navigation satellite system (GNSS) data), real-time and/or near-real-time traffic data, or data about a current path and/or trajectory of the vehicle.

For example, the system may determine whether the vehicle's current lane includes a blocking object based on sensor data representing the position of an object in the vehicle's environment and/or sensor data representing a velocity associated with the object. As another example, the system may determine whether the vehicle's current lane is ending based on: (i) sensor data representing that the vehicle's current lane is ending data, (ii) geolocation data and/or sensor data representing the vehicle's current lane, and/or (iii) map data representing where one or more lanes of the vehicle's current road are ending. In some cases, the system detect that there is a blocking object in the vehicle's environment and then determines that the blocking object is in the vehicle's lane. Example techniques for detecting blocks objects is provided in U.S. Pat. No. 11,763,668, entitled "Detecting Blocking Objects" and filed on Mar. 23, 2021; US Patent Application Publication No. entitled "Collision Zone Detection for Vehicles" and filed on 20220261000, filed on Apr. 29, 2022; and US Patent Application Publication No. 20200406894, entitled "System and Method for Determining a Target Vehicle Speed" and filed on Jun. 28, 2019, all of which are incorporated by reference in their entireties and for all purposes.

As another example, the system may determine that the difference between moving speeds of vehicles in the current lane as compared to a proximate lane meets or exceeds a threshold based on traffic data (e.g., obtained from a traffic monitoring device) and/or sensor data (e.g., radar data) representing the speeds associated with one or more objects (e.g., vehicles in the vehicle's environment). Example techniques for determining speeds associated with objects in the vehicle environment are described in U.S. Pat. No. 11,126,179, entitled "Motion Prediction Based on Appearance and filed on Feb. 21, 2019; U.S. Pat. No. 11,763,668, entitled "Detecting Blocking Objects" and filed on Mar. 23, 2021; US Patent Application Publication No. entitled "Collision Zone Detection for Vehicles" and filed on 20220261000, filed on Apr. 29, 2022; and US Patent Application Publication No. 20200406894, entitled "System and Method for Determining a Target Vehicle Speed" and filed on Jun. 28, 2019, all of which are incorporated by reference in their entireties and for all purposes.

As another example, the system may determine the vehicle's current path and/or trajectory requires a lane change based on: (i) data representing that vehicle's current path and/or trajectory requires a turn, and (ii) sensor data and/or geolocation data representing the vehicle's current lane, and/or (iii) sensor data and/or map data representing that the vehicle's current lane is not authorized for the required turn action.

As another example, the system may determine that vehicle's current path and/or trajectory requires going straight and the vehicle's current lane is changing into a turn-only lane based on: (i) sensor data representing the vehicle's current lane and/or that the vehicle's current lane is changing into a turn-only lane, (ii) map data representing that the vehicle's current lane is changing into a turn-only lane, and/or (iii) geolocation data and/or sensor data representing the vehicle's current lane.

In some cases, the system is configured to determine one or more costs associated with determining whether to activate a vehicle signaling functionality (referred to herein as "signal activation cost(s)"), for example one or more costs associated with determining whether to activate a blinker functionality configured to signal an intention to perform a right and/or left lane change maneuver. In some cases, determining whether to activate a vehicle signaling functionality includes determining a direction and/or side associated with the functionality (e.g., determining whether to activate the left and/or right blinker functionality). In some cases, the signal activation cost(s) may include a subset of costs used to determine a trajectory associated with the vehicle. For example, in some cases, the signal activation cost(s) exclude cost(s) associated with determining whether and/or the likelihood that an evaluated trajectory collides with one or more dynamic objects (referred to herein as "dynamic collision cost(s)"). Accordingly, in some cases, the system: (i) determines whether to adopt a trajectory that includes a lane change maneuver based on a set of costs including one or more dynamic collision costs, and (ii) determines whether to activate a blinker functionality based on a subset of those costs excluding the one or more dynamic collision costs. A dynamic collision cost may be a cost that represents whether a vehicle trajectory is expected to collide with one or more dynamic objects in the vehicle's environment, for example based on one or more predicted object trajectories. A dynamic object may be any object that is determined to be capable of moving with a velocity that exceeds a threshold and/or is detected to be moving with a velocity that exceeds a threshold. Examples of dynamic objects include vehicles, bicycles, and pedestrians. In some cases, a dynamic collision cost is associated with (e.g., determined based on) a relative distance between a vehicle and an object in the vehicle's environment (e.g., a dynamic object in the vehicle's environment). Examples of signal activation costs include a safety cost associated with whether and/or how much a trajectory (e.g., a lane change trajectory) is safe, a progress cost associated with whether and/or how much a trajectory (e.g., a lane change trajectory) contributes to the vehicle's progress towards a destination, and a comfort cost associated with ease, smoothness, and/or predictability of maneuvering a vehicle in accordance with a trajectory (e.g., a lane change trajectory). A lane change trajectory may be a trajectory that includes and/or begins with a lane change action.

In some cases, the system may use the signal activation cost(s) to determine which blinker functionality to activate (e.g., whether to activate a left or right blinker functionality). For example, in some cases (e.g., based on determining that a condition that may trigger a lane change maneuver is satisfied), the system: (i) determines a first set of signal activation costs for a lane change trajectory that includes (e.g., starts with) a right lane change maneuver, (ii) determines a second set of signal activation costs for a lane change trajectory that includes (e.g., starts with) a left lane change maneuver, and (iii) selects which blinker functionality to activate based on comparing the first and second sets of signal activation costs. In some cases, the system: (i) determines a first set of signal activation costs for a lane change trajectory that includes (e.g., starts with) a right lane change maneuver, (ii) determines a second set of signal activation costs for a lane change trajectory that includes (e.g., starts with) a left lane change maneuver, (iii) determines a first cost associated with the right lane change trajectory based on the first set of costs, (iv) determines a second cost associated with the right lane change trajectory based on the second set of costs, and (v) selects the right blinker functionality if the first cost exceeds the second cost and/or selects the left blinker functionality if the second cost exceeds the first cost.

In some cases, one objective behind excluding dynamic collision costs from the set of costs used to determine whether to activate a blinker is to follow the usual and/or expected behavioral pattern of a human driver. A human driver may react to a situation that may require lane change (e.g., a road blockage) by turning on a blinker based on detecting the situation and then determining when to perform the lane change based on the movement patterns associated with the dynamic objects (e.g., vehicles) in the adjacent line. Similarly, the system may be configured to: (i) determine, based on a set of costs excluding dynamic collision costs, that there is a need for a lane change and thus activate a blinker functionality, and (ii) determine, based on a set of costs including dynamic collision, when to perform the lane change.

Accordingly, in some cases, the system may be configured to activate a lane change blinker functionality based on a set of signal activation costs, such as a set of signal activation costs that excludes one or more dynamic collision costs. Examples of signal activation costs include a cost associated with whether a trajectory collides with and/or intersects with a point that is within a threshold proximity of a static object, a cost associated with whether a trajectory violates a constraint (e.g., a legal constraint, such as a traffic regulation), a cost associated with whether a trajectory includes and/or intersects with a lane ending, a cost associated with whether a trajectory crosses a lane boundary, a cost associated with whether a trajectory intersects with a point that is off of (e.g., on the shoulder of) a road, and a cost associated with an extent of progression of a trajectory toward reaching an intended destination. In some cases, to determine a set of signal activation costs, the system: (i) receives (e.g., from a trajectory determination component) a set of trajectory determination costs used to determine whether to accept a trajectory, and (ii) determines a set of signal activation costs at least by excluding one or more dynamic collision costs from the set of trajectory determination costs. In some cases, to determine a set of signal activation costs, the system: (i) receives (e.g., from a trajectory determination component) a set of trajectory determination costs used to determine whether to accept a trajectory, and (ii) selects a subset of those trajectory determination costs that are designated as being related to determining whether to activate a lane change blinker functionality.

Accordingly, in some cases, the system determines whether and/or when to activate a blinker functionality based on a set of signal activation costs. As described above, in some cases, the system determines to activate a blinker functionality based on determining that: (i) a condition that may trigger a lane change maneuver is satisfied, and (ii) the blinker functionality should be activated based on a set of signal activation costs associated with a trajectory that includes the lane change maneuver. For example, in some cases, the system may determine that based on the set of signal activation costs that the lane change trajectory is the lowest-cost trajectory and/or has a total cost measure that falls below a threshold. Based on this determination, the system may determine to activate a blinker functionality associated with the lane change maneuver.

In some cases, the system uses a first set of costs to determine whether to control a vehicle based on a trajectory that includes a lane change maneuver and a second set of costs to determine whether to activate a blinker functionality associated with that lane change maneuver. For example, the system may use a second set of costs to determine a cost associated with the lane change trajectory and determine whether to activate the blinker functionality based on the determined cost. Accordingly, in some cases, the system may determine to activate a blinker functionality based on a different set of costs (e.g., a reduced set of costs) relative to the set of costs used to determine whether to adopt a lane change trajectory. As a result, the system may activate the blinker functionality "proactively" before making the lane change.

For example, in some cases, the system may determine whether to control a vehicle in accordance with a lane change trajectory based on a set of costs associated with the lane change trajectory that includes one or more dynamic collision costs. Additionally, the system may determine whether to activate a blinker functionality associated with the lane change maneuver based on a set of costs associated with the lane change trajectory that excludes one or more dynamic collision costs. Accordingly, in some cases, the system may perform two evaluations of the lane change trajectory: a first evaluation to determine whether to adopt the lane change trajectory as the controlling trajectory based on the set of costs including the dynamic collision cost(s), and a second evaluation to determine whether to activate a blinker functionality associated with the lane change maneuver based on the set of costs excluding the dynamic collision cost(s). Therefore, in some cases, the system may reject a lane change trajectory that includes a lane change maneuver by considering the dynamic collision cost(s) associated with that trajectory, but may nevertheless activate a blinker functionality associated with that lane change maneuver without considering the dynamic collision cost(s). As described above, after the system activates the blinker functionality associated with the lane change maneuver, the system may reduce a signal timing cost associated with a lane change trajectory in a future time, which may increase the likelihood of adoption of the lane change trajectory as the controlling vehicle trajectory in the future time.

In some cases, the system determines signal activation costs based on a subset of trajectory determination costs used for determining whether to adopt a vehicle trajectory that includes a lane change maneuver. Accordingly, in some cases, how the system determines signal activation costs may be dependent on how the system determines trajectory determination costs. For example, in some cases, the system determines trajectory determination costs associated with a set of trajectories using stochastic optimization. Stochastic optimization may include determining one or more sampled trajectories from a probability distribution (e.g., associated with a feature space characterized by one or more trajectory features), determining cost measures associated with the probability distribution, and updating the probability distribution to increase the probability associated with and/or likelihood of sampling from region(s) of the feature space corresponding to lower-cost sampled trajectories. These operations may be performed iteratively for a number of iterations to gradually increase the likelihood of sampling lower-cost trajectories relative to the likelihood of sampling higher-cost trajectories.

In some cases, during stochastic optimization, the system performs a number of iterations of a process including: (i) receiving an input probability distribution over a feature space (e.g., a multi-dimensional space) characterized by one or more trajectory features, (ii) samples (e.g., randomly samples) a number of trajectories from the input probability distribution, (iii) determines a set of trajectory determination costs for each sampled trajectory, (iv) determines a total cost measure for each sampled trajectory based on the set of trajectory determination costs associated with that trajectory, and (v) updates the input probability distribution based on the total cost measures associated with the sampled trajectories (e.g., to assign higher probabilities and/or frequencies to one or more regions of the feature space that are proximate to the lower-cost sampled trajectories) to generate an output probability distribution. In some cases, the input probability distribution received at the first iteration is an initial probability distribution (e.g., a randomly generated probability distribution, a predefined probability distribution such as a uniform probability distribution, and/or the like). In some cases, the input probability distribution received at an iteration other than the first iteration is the output probability distribution generated at a preceding iteration.

In some cases, the system may determine the signal activation cost(s) associated with a trajectory that is sampled using stochastic optimization based on a subset of the trajectory determination cost(s) associated with that sampled trajectory, as determined using stochastic optimization. For example, during an Nth iteration of stochastic optimization, the system may sample, from a probability distribution, a trajectory R1, a trajectory R2, and a trajectory RE3. The system may then determine a set of trajectory determination costs C1 associated with R1, a set of trajectory determination costs C2 associated with R2, and a set of trajectory determination costs C3 associated with R3. The system may then determine, based on C1-C3, that R1 has a lower cost than R2 and R3. Based on this determination, the system may update the probability distribution by increasing the probability associated with R1. At an (N+1)th iteration, the system may sample, from the updated probability distribution, a trajectory R4, a trajectory R5, and a trajectory R6. The system may then determine a set of trajectory determination costs C4 associated with R4, a set of trajectory determination costs C5 associated with R5, and a set of trajectory determination costs C6 associated with R6. In this example, the system may determine a set of signal activation costs associated with R1 based on a subset of C1 (e.g., a subset of C1 excluding dynamic collision cost(s)), a set of signal activation costs associated with R2 based on a subset of C2 (e.g., a subset of C2 excluding dynamic collision cost(s)), a set of signal activation costs associated with R3 based on a subset of C3 (e.g., a subset of C3 excluding dynamic collision cost(s)), a set of signal activation costs associated with R4 based on a subset of C4 (e.g., a subset of C4 excluding dynamic collision cost(s)), a set of signal activation costs associated with R5 based on a subset of C5 (e.g., a subset of C5 excluding dynamic collision cost(s)), and a set of signal activation costs associated with R6 based on a subset of C6 (e.g., a subset of C6 excluding dynamic collision cost(s)).

In some cases, the system determines trajectory determination costs associated with a set of trajectories using a tree-based technique. The tree-based technique may include determining a tree structure based on a set of proposed actions for a vehicle to take to traverse an environment. A branch of the tree structure may include a node (e.g., a state node representing a detected and/or predicted state of the environment, an action node representing an action, and/or the like). The branch may include a lateral movement. The tree-based technique may involve expanding the tree structure by determining, for one or more branches of the tree structure, one or more child nodes representing states that result from the vehicle taking the action represented by the action node of the branch. The system may determine one or more trajectory costs for a branch by evaluating the one or more trajectory costs based on the action represented by the action node and/or the state represented by one or more state nodes of the branch. Example techniques for determining trajectories and/or trajectory determination costs using a tree-based technique are described in U.S. Pat. No. 11,360,477, filed on Jun. 22, 2020 and entitled "Trajectory Generation using Temporal Logic and Tree Search," and U.S. Pat. No. 10,671,076, filed on Dec. 6, 2017 and entitled "Trajectory Prediction of Third-Party Objects using Temporal Logic and Tree Search," both of which are incorporated by reference in entirety and for all purposes.

In some cases, the system may determine a set of signal activation costs for a trajectory represented by a branch and/or segment of the tree structure based on a subset of the one or more trajectory costs associated with that branch. For example, the system may determine the set of signal activation costs for a trajectory based on the subset of trajectory costs excluding one or more dynamic collision costs, while the full set of trajectory costs used for determining whether to adopt the trajectory includes the dynamic collision costs. In some cases, to determine the signal activation costs for trajectories in accordance with the tree-based technique, the system may perform a "static expansion" of a tree structure based on a set of costs excluding dynamic collision costs (e.g., based on determining predicted environment states without considering dynamic object positioning and/or velocity). The static expansion may include predicting a trajectory forward in time while ignoring costs associated with dynamic objects. In some cases, the system determines the signal activation cost(s) associated with a trajectory corresponding to a branch of a tree structure generated by static expansion based on one or more cost measures used to perform the static expansion, such as based on cost measures associated with a tree segment (e.g., a tree branch) containing an action sequence corresponding to a trajectory.

As described above, in some cases, the system determines to activate a blinker functionality based on determining that a condition that may trigger a lane change maneuver is satisfied. In some cases, a proactive blinker functionality is triggered based on determining that such a lane change condition is satisfied. In some cases, the system deactivates a blinker functionality and/or deactivates the proactive blinker functionality based on determining that no lane change condition is satisfied. For example, in some cases, the system deactivates a blinker functionality and/or deactivates the proactive blinker functionality based on detecting that a current lane associated with a vehicle does not include a blocking object (e.g., a static object and/or a stationary non-dynamic object). As another example, in some cases, the system deactivates a blinker functionality and/or deactivates the proactive blinker functionality based on detecting that a current lane associated with a vehicle is not ending. As another example, in some cases, the system deactivates a blinker functionality and/or deactivates the proactive blinker functionality based on detecting that a current lane associated with a vehicle is not merging with other lanes. As another example, in some cases, the system deactivates a blinker functionality and/or deactivates the proactive blinker functionality based on detecting that a current lane associated with a vehicle is not slower than an adjacent lane (e.g., that a difference between a velocity associated with the current lane and a velocity associated with an adjacent lane does not exceed a threshold). As another example, in some cases, the system deactivates a blinker functionality and/or deactivates the proactive blinker functionality based on detecting that a planned route does not require a lane change (e.g., to exit and/or merge onto a different road). As another example, in some cases, the system deactivates a blinker functionality and/or deactivates the proactive blinker functionality based on detecting that traffic laws and/or road signs do not require a lane change. As another example, in some cases, the system deactivates a blinker functionality after exiting a pick-up and drop-off (PUDO) zone.

In some cases, the techniques and/or systems discussed herein may enhance the safety of passengers in a vehicle and/or other individuals in proximity to the vehicle. For example, in some cases, the techniques described herein increase the safety of a lane change maneuver performed by a vehicle by increasing the likelihood that the vehicle proactively and/or timely signals the lane change maneuver. As another example, in some cases, the techniques described herein increase the safety of a lane change maneuver performed by a vehicle by increasing the likelihood that the vehicle delays the lane change maneuver until the vehicle signals the lane change maneuver for a period of time (e.g., for a threshold period of time). As another example, in some cases, the techniques described herein increase the safety of a lane change maneuver performed by a vehicle by increasing the likelihood that the lane change maneuver is performed in a "natural" manner that better complies with expected and/or regular human behavioral patterns. Accordingly, the techniques described herein may enhance the safety and/or reliability of a vehicle, such as an autonomous and/or semi-autonomous vehicle.

In some cases, the techniques described herein increase the computational efficiency of determining when to activate a blinker functionality. In some cases, the techniques described herein determine when to activate a blinker functionality based on a set of costs that are smaller than the set of costs used for trajectory determination. For example, in some cases, the system may determine when to activate a blinker functionality based on a set of costs excluding one or more dynamic collision costs used for trajectory determination. By decoupling determinations about blinker activation from trajectory determinations and/or performing the former determinations based on a reduced set of costs relative to the latter determinations, the techniques described may decrease the computational efficiency of generating determinations about blinker activation (e.g., about whether and/or when to activate a blinker functionality). Additionally, in some cases, by determining whether and/or when to activate a blinker functionality based on a set of costs that are smaller than the set of costs used for trajectory determination, the techniques described herein increase the speed and/or responsiveness of determinations related to blinker activation. This speed and/or responsiveness increase may further increase the safety and/or reliability of performing a lane change maneuver by increasing the likelihood that blinker activations are performed in a timelier and/or more proactive manner.

The methods, apparatuses, and systems described herein may be implemented in a number of ways. Example implementations are provided below with reference to the following figures. Although discussed in the context of an autonomous vehicle, in some examples, the methods, apparatuses, and systems described herein may be applied to a variety of systems. In another example, the methods, apparatuses, and systems may be utilized in an aviation or nautical context. Additionally, or alternatively, the techniques described herein may be used with real data (e.g., captured using sensor(s)), simulated data (e.g., generated by a simulator), or any combination thereof.

FIG. 1 provides an example environment 100 that may enable determining whether to perform a lane change maneuver and/or activate a blinker functionality associated with a lane change maneuver. As depicted in FIG. 1, the environment 100 includes a vehicle 102, an object 104 (e.g., another vehicle), and one or more blocking objects 106. The vehicle 102 may, for example, be an autonomous and/or semi-autonomous vehicle. As depicted in FIG. 1, the vehicle 102 is in a right lane while the object 104 is in a left lane. The vehicle 102 is moving toward the blocking object(s) 106, which are also in the right lane, while the object 106 is moving in the opposite direction.

The vehicle 102 may include a set of blinkers, such as a blinker A 110A and a blinker B 110B. The blinkers may enable providing a signal indicating an intention to perform a movement by the vehicle 102, such as a lane change maneuver. For example, in some cases, activation of blinker A 110A may indicate an intention to perform a right lane change maneuver, while activation of blinker B 110B may indicate an intention to perform a left lane change maneuver.

The vehicle 102 includes one or more computing devices 112. The computing device(s) 112 may be configured to control the vehicle and/or control one or more vehicle functionalities, such as a blinker functionality associated with the vehicle 102 (e.g., with at least one of blinker A 110A or blinker B 110B). The computing device(s) 112 may include at least a subset of components of and/or perform at least a subset of functionalities associated with the vehicle computing device(s) 504, as described below in relation to FIG. 5.

The computing device(s) 112 may include one or more sensors 114 and a memory 116. The sensor(s) 114 may be configured to capture sensor data (e.g., image data, lidar data, radar data, GNSS data, and/or the like) and provide the sensor data to one or more software components stored on the memory 116, such as to one or more of the prediction component 118, the proactive signaling component 120, or the planning component 122. The sensor(s) 114 may include at least a subset of the components of and/or perform at least a subset of functionalities associated with sensor(s) 506, as described below in relation to FIG. 5. The memory 116 may include at least a subset of the components of and/or perform at least a subset of functionalities associated with memory 518, as described below in relation to FIG. 5.

As depicted in FIG. 1, the memory 116 stores a set of software components, such as one or more of the prediction component 118, the proactive signaling component 120, or the planning component 122. The software component(s) stored on the memory 116 may be executed by a processor associated with the computing device(s) 112, such as the processor 516 as described below in relation to FIG. 5.

The prediction component 118 may be configured to predict a trajectory associated with an object detected in the vehicle environment. For example, the prediction component 118 may be configured to predict a trajectory for object 104. The prediction component 118 may include at least a subset of the components of and/or perform at least a subset of functionalities associated with the prediction component 528, as described below in relation to FIG. 5.

The proactive signaling component 120 may be configured to determine whether to activate a blinker functionality associated with the vehicle 102 (e.g., a blinker functionality associated with one or more blinkers of the vehicle 102, such as with at least one of blinker A 110A or blinker B 110B). For example, the proactive signaling component 120 may be configured to determine whether to activate a blinker functionality associated with a right lane change maneuver, such as by activating blinker A 110A. As another example, the proactive signaling component 120 may be configured to determine whether to activate a blinker functionality associated with a left lane change maneuver, such as by activating blinker B 110B. The proactive signaling component 120 may include at least a subset of the components of and/or perform at least a subset of functionalities associated with the proactive signaling component 532, as described below in relation to FIG. 5.

In some cases, to determine whether to activate a blinker functionality associated with a lane change maneuver, the proactive signaling component 120 performs the operations associated with the proactive signaling process 124. In accordance with the proactive signaling process 124 includes, at operation 124(A), the proactive signaling component 120 determines that a condition that may trigger a lane change condition is satisfied. The condition may be associated with detecting a blocking object in the detected current lane of the vehicle 102 and/or within a threshold proximity of a current and/or predicted position of the vehicle 102. The predicted position of the vehicle 102 may be determined based on a current controlling trajectory used to control the vehicle 102.

For example, in the environment 100 depicted in FIG. 1, the proactive signaling component 120 may determine that the blocking object(s) 106 are on the current lane associated with the vehicle 102 and/or within a threshold proximity of the vehicle 102 and/or a predicted position of the vehicle 102 if the vehicle 102 follows the current controlling trajectory (e.g., the trajectory associated with moving toward the blocking object(s) 106). Based on this determination, the proactive signaling component 120 may determine that a condition associated with triggering a potential lane change is satisfied.

At operation 124(B), the proactive signaling component 120 determines a set of signal activation costs for a trajectory that includes a lane change maneuver. The set of signal activation costs may exclude one or more dynamic collision costs determined based on a relative distance and/or proximity to a dynamic object. For example, in FIG. 1, the proactive signaling component 120 may determine a set of signal activation costs associated with a trajectory that includes a left lane change maneuver by excluding (e.g., from a set of costs associated with that left lane change trajectory) a dynamic collision cost associated with potential collision with the object 104, which is a dynamic object. This dynamic collision cost may capture a likelihood that the left lane change maneuver collides with the dynamic object.

At operation 124(C), the proactive signaling component 120 determines to enable a blinker functionality based on the set of signal activation costs associated with the lane change trajectory. The proactive signaling component 120 may determine, based on the set of signal activation costs (e.g., the set of costs excluding a dynamic collision cost), that the lane change trajectory is optimal (e.g., is the lowest-cost trajectory, is among the N lowest-cost of the evaluated trajectories, has a total cost that falls below a threshold, and/or the like). Based on this determination, the proactive signaling component 120 may activate a blinker functionality configured to indicate an intention to perform the particular lane change associated with the lane change trajectory.

For example, the proactive signaling component 120 may determine that a trajectory including a left lane change maneuver is optimal based on a set of signal activation costs, such as a set of signal activation costs including a cost associated with the likelihood of colliding with object 104 (e.g., as determined based on a relative distance and/or proximity of the vehicle 102 and the object 104). Based on this determination, the system may activate a blinker functionality associated with a left lane change maneuver, for example by activating and/or causing the activation of blinker B 110B.

The planning component 122 may be configured to determine a controlling trajectory associated with the vehicle 102, for example based on predicted object trajectories determined by the prediction component 118. In some cases, the planning component 122 may be configured to determine whether to control the vehicle based on a trajectory that includes a lane change maneuver, such as a lane change maneuver associated with changing the lane of the vehicle 102 to the left lane currently occupied by the object 104 (e.g., in order to avoid the blocking object(s) 106). The planning component 122 may include at least a subset of the components of and/or perform at least a subset of functionalities associated with the planning component 530, as described below in relation to FIG. 5.

In some cases, the planning component 122 may determine whether to control the vehicle 102 based on a lane change trajectory including a particular lane change maneuver based at least in part on a signal timing cost value associated with the particular lane change maneuver. The signal timing cost value may represent and/or be determined based on a length of time that a blinker functionality associated with the particular lane change maneuver has been active. For example, to evaluate a trajectory including a right lane change maneuver, the planning component 122 may determine and use a signal timing cost value representing a length of time that blinker A 110A has been active. As another example, to evaluate a trajectory including a left lane change maneuver, the planning component 122 may determine and use a signal timing cost value representing a length of time that blinker B 110B has been active.

In some cases, to determine whether to control the vehicle 102 based on a lane change trajectory including a particular lane change maneuver, the planning component 122 performs the operations of the trajectory determination process 126. In accordance with the trajectory determination process 126, at operation 126(A), the planning component 122 determines a signal timing cost value. The signal timing cost value may represent how long a blinker functionality associated with the particular lane change maneuver has been active. For example, to evaluate a left lane change trajectory including a left lane change maneuver, the planning component 122 may determine a length of time that blinker B 110B has been active. This length may be associated with the length of time from the above-described execution of the proactive signaling process 124, which may have led to activation of blinker B 110B to signal an intention to perform a left lane change maneuver.

At operation 126(B), the planning component 122 determines to control the vehicle based on a lane change trajectory. The system may determine to control the vehicle based on the lane change trajectory based on a set of trajectory determination costs associated with the lane change trajectory. The set of costs may include: (i) the signal timing cost value determined at operation 126(A), and/or (ii) a set of dynamic collision costs, such as a set of dynamic collision costs representing the likelihood of colliding with the object 104 if controlling the vehicle based on a left lane change trajectory.

At operation 126(C), the system controls the vehicle 102 based on the lane change trajectory. Controlling the vehicle may include actuating one or more drive systems of the vehicle 102 to perform a lane change maneuver. Examples of drive systems include the drive system(s) 514, as described below in relation to FIG. 5.

Figure 2:
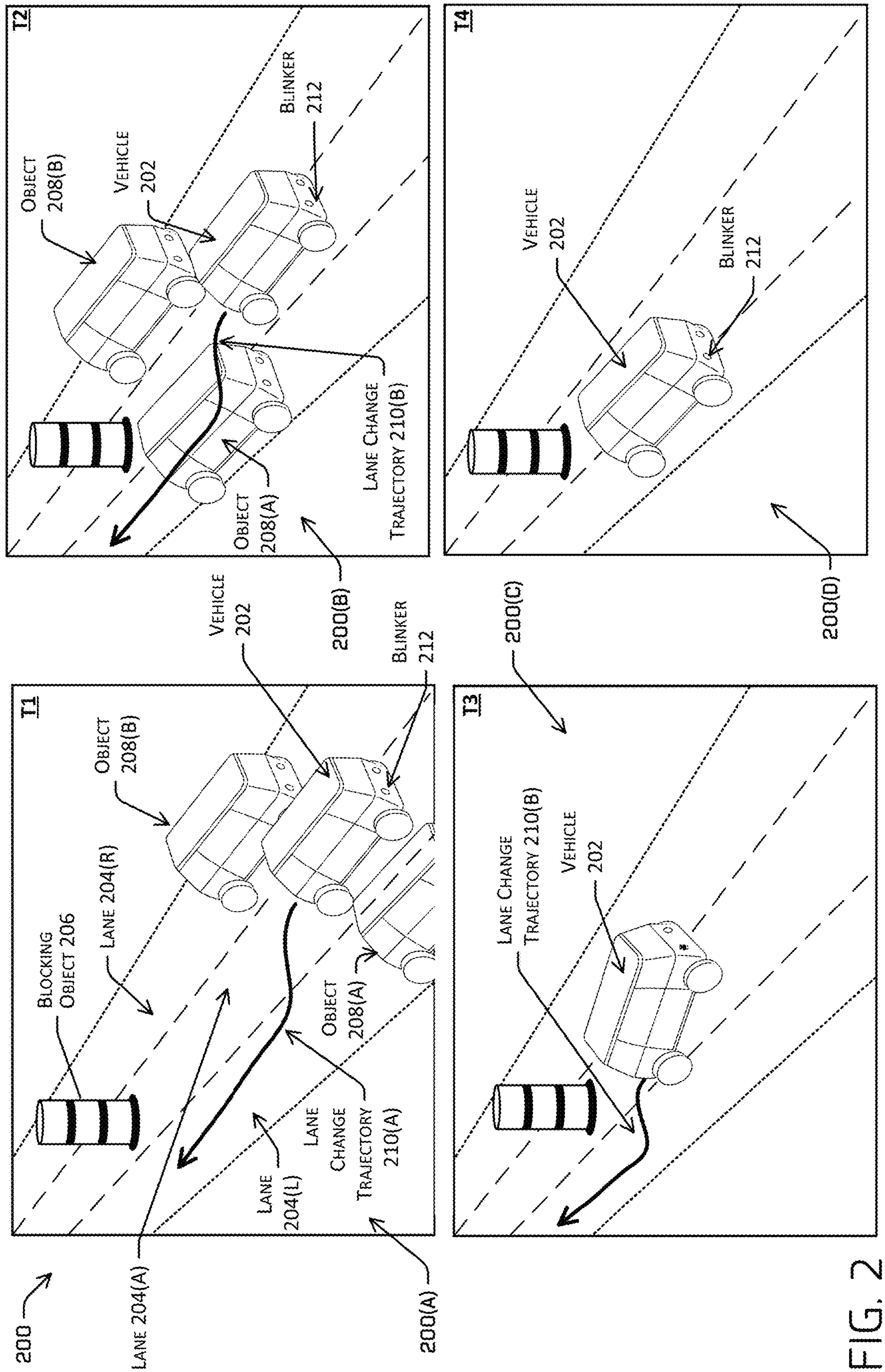
FIG. 2 provides an operational example of performing a lane change maneuver with a proactive blinker signal.

FIG. 2 provides an operational example 200 of performing a lane change maneuver with a proactive blinker signal. As depicted in FIG. 1, at a time T1, a scenario 200(A) includes a vehicle 202 in a lane 204(A), which is to the left of a lane 204(R) and to the left of a lane 204(L). The lane 204(A) (e.g., the center lane) includes a blocking object 206, while the lane 204(L) (e.g., the left lane) includes the object 208(A) and the lane 204(R) (e.g., the right lane) includes the object 208(B). During the scenario 200(A), the vehicle 202 is determining whether to control the vehicle based on a lane change trajectory 210(A) that includes a left lane change maneuver into the left lane 204(L), which includes the object 210(A). The vehicle 202 may determine not to make a right change maneuver based on the presence of object 208(B) in lane 204®. Additionally, the blinker 212 of the vehicle 202 is inactive. The blinker 212 may be configured to signal an intention to perform a left lane change maneuver.

At a time T2 after T1, a scenario 200(B) includes the blinker 212 being active, while the vehicle 202 is still in lane 204(A). Meanwhile, the object 208(A) is about to pass the vehicle 202. The scenario 200(B) may result from: (i) refraining from controlling the vehicle 202 based on the lane change trajectory 210(A) (e.g., based on a dynamic collision cost associated with a likelihood of colliding with the object 208(A) in the event of following the lane change trajectory 210(A) and/or based on determining that a high signal timing value in light of the inactivation of the blinker 212 at time T1), (ii) activating the blinker 212 to indicate an intention to perform a left lane change maneuver (e.g., based on evaluating the lane change trajectory 210(A) based on a set of costs excluding a cost associated with a likelihood of colliding with the object 208(A) in the event of following the lane change trajectory 210(A)), and/or (iii) controlling the vehicle 202 based on a trajectory that includes going on the lane 204(A) with a reduced speed.

Scenario 200(B) may also include determining whether to perform a lane change trajectory 210(B) that includes a left lane change maneuver into the lane 204(L). This determination may be based on: (i) a reduced signal timing cost value relative to T1, based on the activation of blinker 212 at T1, (ii) a reduced dynamic collision cost relative to T1, based on determining that there is less likelihood that lane change trajectory 210(B) collides with object 208(A) relative to the likelihood that the lane change trajectory 210(A) collides with object 208(A), and/or (iii) an increased likelihood that lane change trajectory 210(B) collides with blocking object 206 relative to the likelihood that the lane change trajectory 210(A) collides with object 208(A) (e.g., as determined based on closer proximity of the vehicle 202 to blocking object 208(A) at T2, relative to T1).

At a time T3 after T2, a scenario 200(C) includes controlling the vehicle 202 based on the lane change trajectory 210(B) to perform a left lane change maneuver into the lane 204(L). The system may determine to control the vehicle 202 based on the lane change trajectory 210(B) based on a set of trajectory determination costs associated with the lane change trajectory 210(B), as computed in T2. The trajectory determination costs may include a signal timing cost value determined based on activation of blinker 212 at T1 and/or a dynamic collision cost determined based on a likelihood that lane change trajectory 210(B) collides with the object 208(A). Scenario 200(C) may further include keeping the blinker 212 active based on determining that a condition triggering the lane change (e.g., the detection of the blocking object 208(A) in the current lane of the vehicle 202, which is still the lane 204(A)) is still active.

At a time T4 after T3, a scenario 200(D) includes the vehicle 202 in the lane 204(L). This may result from controlling the vehicle 202 based on the lane change trajectory 210(B) at time T3. Scenario 200(D) may also include deactivating blinker 212. This deactivation may be based on determining that a condition triggering the lane change (e.g., the detection of a blocking object in the current lane of the vehicle 202, which is now the lane 204(L)) is no longer active.

Figure 3:
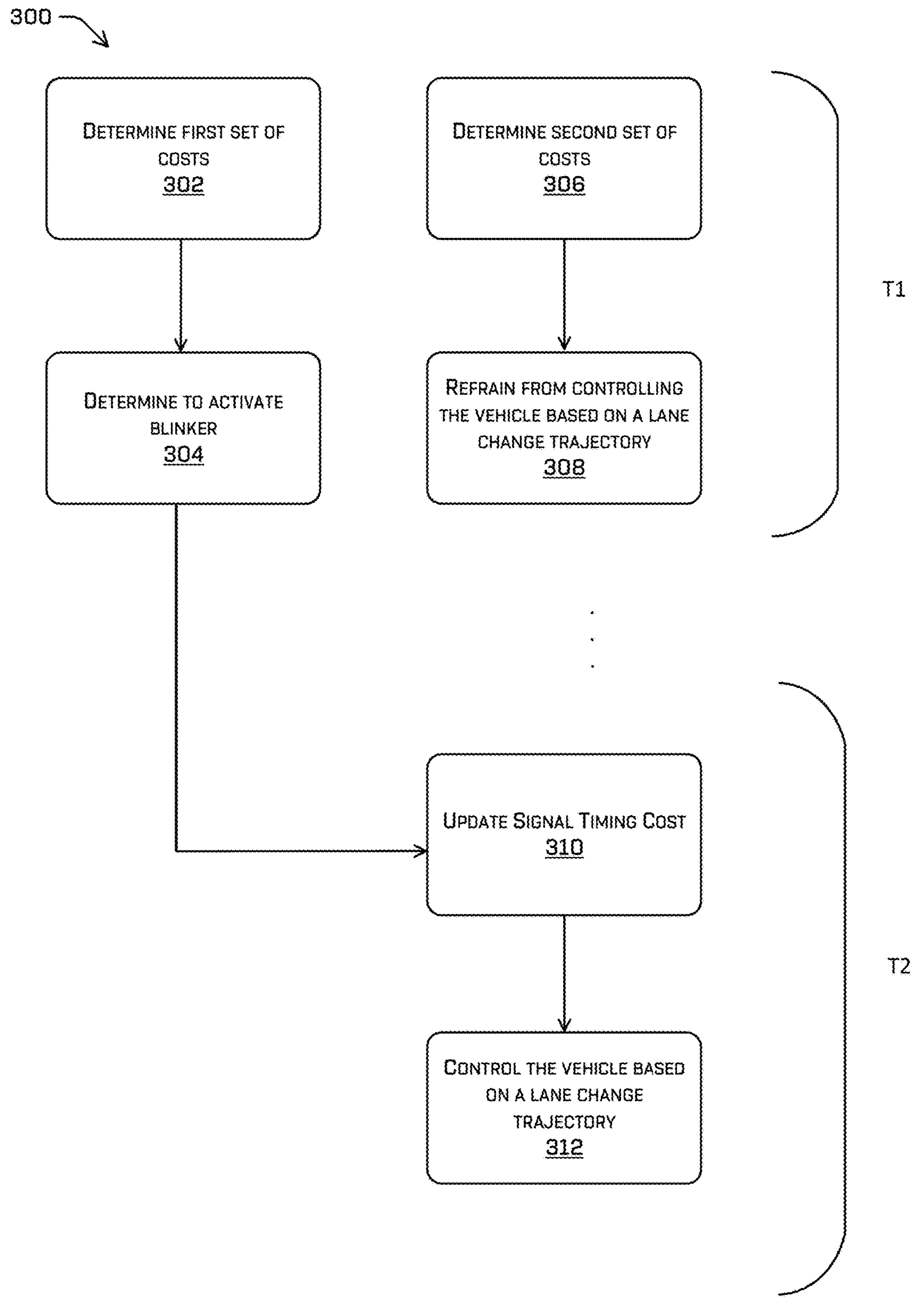
FIG. 3 is a flowchart diagram of an example process for determining whether to control a vehicle based on a lane change trajectory and/or whether to activate the vehicle's blinker functionality.

FIG. 3 is a flowchart diagram of an example process 300 for determining whether to control a vehicle based on a lane change trajectory and/or whether to activate the vehicle's blinker functionality. At operation 302, which occurs at a time T1, an example system determines a first set of costs with a lane change trajectory. The first set of costs may exclude one or more costs associated with whether the lane change trajectory is predicted to collide with one or more dynamic objects.

At operation 304, which also occurs at T1, the system determines to activate a blinker functionality and/or a side (e.g., a direction) associated with the blinker functionality based on the first set of costs. Operation 304 may include determining to activate a blinker functionality configured to indicate an intention to perform a lane change maneuver and/or determining whether to the blinker functionality associated with the right and/or left lane change maneuver. In some cases, the system determines a first cost measure associated with the lane change trajectory based on the first set of costs and determines to activate the blinker functionality based on determining: (i) that the first cost measure falls below a threshold, and/or (ii) that the first cost measure is among the N lowest cost measures among a first set of cost measures associated with a set of evaluated trajectories (e.g., a set of evaluated trajectories associated with T1). The first set of cost measures may include, for each evaluated trajectory, a cost measure determined based on a set of costs excluding one or more dynamic collision costs.

At operation 306, which also occurs at T1, the system determines a second set of costs associated with the lane change trajectory. The second set of costs may include one or more costs associated with whether the lane change trajectory is predicted to collide with one or more dynamic objects. In some cases, the first set of costs includes a subset of the second set of costs. The second set of costs may also include a cost indicating that the blinker functionality associated with the lane change trajectory is not active at T1.

At operation 308, which also occurs at T1, the system determines to refrain from controlling the vehicle based on the lane change trajectory based on the second set of costs. In some cases, the system determines a second cost measure associated with the lane change trajectory based on the second set of costs and determines to refrain from controlling the vehicle in accordance with the lane trajectory based on determining: (i) that the second cost measure equals or exceeds a threshold, and/or (ii) that the second cost measure is not among the N lowest cost measures among a second set of cost measures associated with a set of evaluated trajectories (e.g., a set of evaluated trajectories associated with T1). The second set of cost measures may include, for each evaluated trajectory, a cost measure determined based on a set of costs including one or more dynamic collision costs. In some cases, operations 306 and 308 are performed in parallel with and/or in a sequential manner in relation to the operations 302 and 304.

At operation 310, which occurs at a subsequent time T2, the system updates a signal timing cost value based on the activation of the blinker functionality at operation 304 and at time T1. For example, in some cases, the system may reduce the signal timing cost associated with a lane change trajectory that includes a lane change maneuver. The lane change maneuver may be associated with the same lane change maneuver whose respective blinker functionality was activated at operation 304. For example, if the blinker functionality activated at operation 304 was associated with a left lane change maneuver, the system may decrease the signal timing cost associated with a lane change trajectory that includes a left lane change maneuver. As another example, if the blinker functionality activated at operation 304 was associated with a right lane change maneuver, the system may decrease the signal timing cost associated with a lane change trajectory that includes a right lane change maneuver.

At operation 312, which also occurs at T2, the system determines to control the vehicle based on a lane change trajectory based on the signal timing cost. In some cases, the system determines a third set of costs associated with the lane change trajectory. The third set may include the signal timing cost and/or a dynamic collision cost. In some cases, the system determines a third cost measure associated with the lane change trajectory based on the third set of costs and determines to control the vehicle in accordance with the lane trajectory based on determining: (i) that the third cost measure falls below a threshold, and/or (ii) that the third cost measure is not among the N lowest cost measures among a third set of cost measures associated with a set of evaluated trajectories (e.g., a set of evaluated trajectories associated with T2). The third set of cost measures may include, for each evaluated trajectory, a cost measure determined based on a set of costs including one or more dynamic collision costs.

Figure 4:
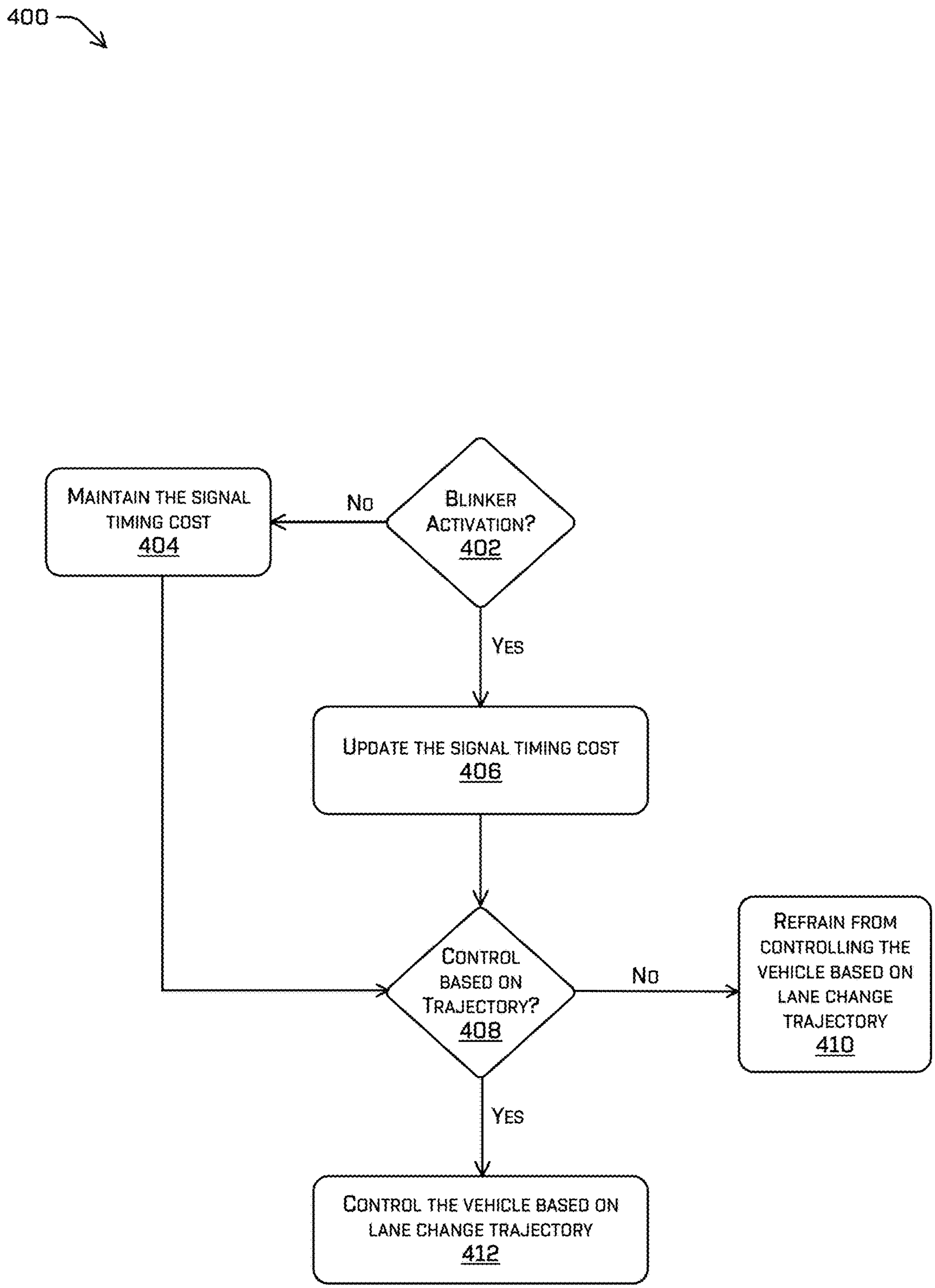
FIG. 4 is a flowchart diagram of an example process for evaluating a candidate vehicle trajectory that includes a lane change maneuver.

FIG. 4 is a flowchart diagram of an example process 400 for evaluating a candidate vehicle trajectory that includes a lane change maneuver.

At operation 402, the system determines whether a blinker functionality associated with the lane change trajectory is active. If the system determines that the blinker functionality is not active (operation 402—No), the system proceeds to operation 404 to maintain an existing value for the signal timing cost associated with the lane change trajectory. However, if the system determines the blinker functionality is active (operation 402—Yes), the system proceeds to operation 406 to update the existing value for the signal timing cost associated with the lane change trajectory. For example, the system may update the signal timing cost value based on a length of time associated with activation of the blinker functionality.

At operation 408, the system determines whether to control the vehicle based on the lane change trajectory. For example, the system may determine whether to control the vehicle based on a set of trajectory determination costs including the signal timing cost. The set of trajectory determination costs may also include the dynamic collision cost(s) determined at operation 402, and/or other costs such as a cost associated with whether the trajectory collides with and/or intersects with a point that is within a threshold proximity of a static object, a cost associated with whether the trajectory violates a constraint (e.g., a legal constraint, such as a traffic regulation), a cost associated with whether the trajectory includes and/or intersects with a lane ending, a cost associated with whether the trajectory crosses a lane boundary, a cost associated with whether the trajectory intersects with a point that is off of (e.g., on the shoulder of) a road, and a cost associated with an extent of progression of the trajectory toward reaching an intended destination, and/or the like. In some cases, the system determines a total cost measure for the lane change trajectory based on the set of trajectory determination costs and determines whether to adopt the lane change trajectory based on the total cost measure (e.g., based on whether the total cost measure falls below a threshold value).

If the system determines to control the vehicle based on the lane change trajectory (operation 408—Yes), the system proceeds to operation 410 to control the vehicle based on the lane change trajectory. For example, the system may control one or more vehicle systems (e.g., propulsion system, steering system, braking system, and/or the like) to cause the vehicle to execute the lane change maneuver specified by the trajectory. However, if the system determines not to control the vehicle based on the lane change trajectory (operation 408—No), the system proceeds to operation 12 to refrain from controlling the vehicle based on the lane change trajectory. For example, the system may control the vehicle based on a different trajectory, such as a trajectory with a slow-down movement pattern.

Figure 5:
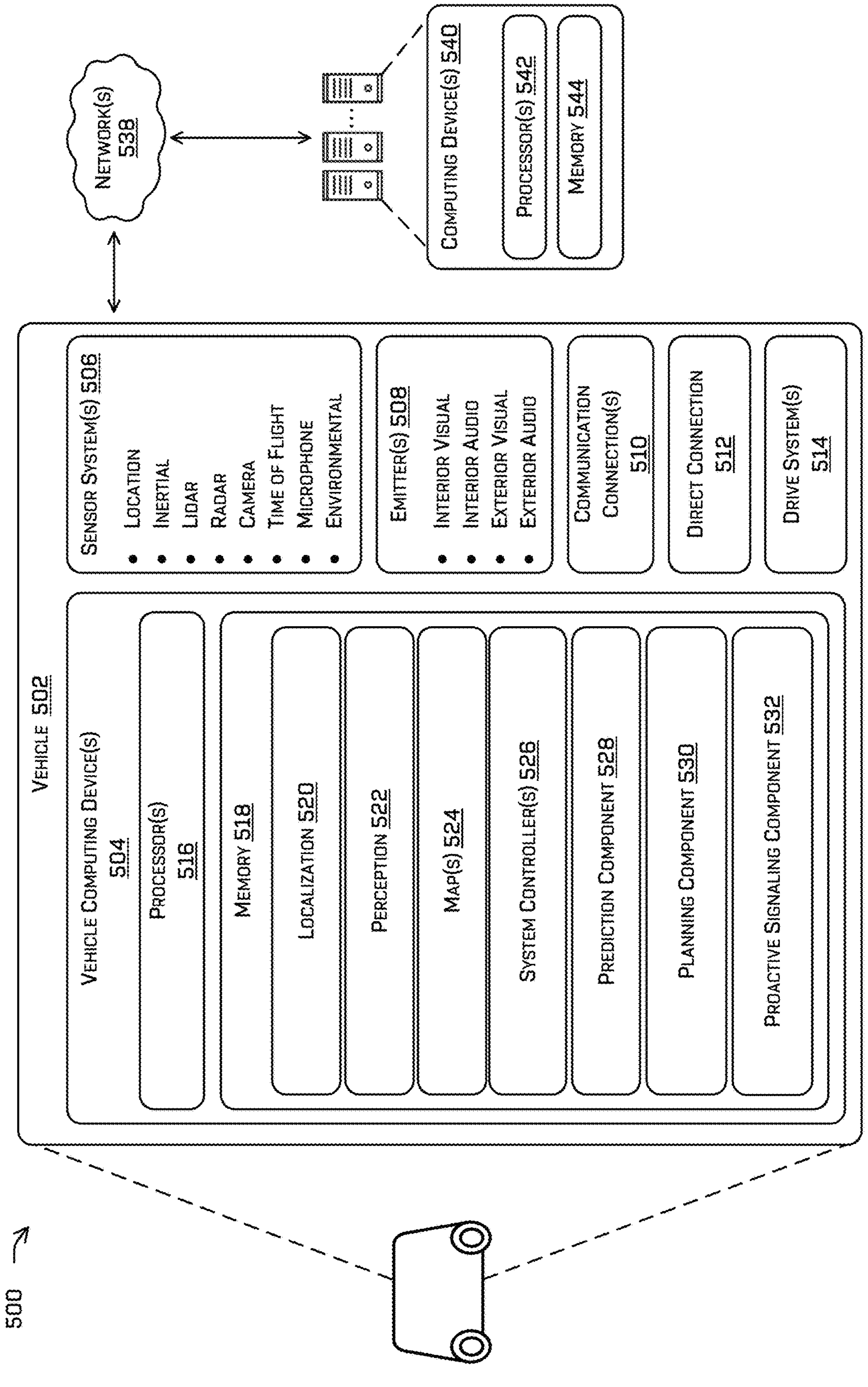
FIG. 5 depicts a block diagram of an example system for implementing various techniques described herein.

FIG. 5 depicts a block diagram of an example system 500 for implementing various techniques described herein. In some instances, the example system 500 may include vehicle 502 and one or more computing devices 540. In some instances, the vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 502 may be a fully or partially autonomous vehicle having any other level or classification. Moreover, in some instances, the techniques described herein may be usable by non-autonomous vehicles as well. These are merely examples, and the systems and methods described herein also may be incorporated into any ground-borne, airborne, or waterborne vehicle, including those ranging from vehicles that need to be manually controlled by a driver at all times, to those that are partially or fully autonomously controlled.

The vehicle 502 may include vehicle computing device(s) 504, sensor(s) 506, emitter(s) 508, network interface(s) 510, at least one direct connection 512 (e.g., for physically coupling with the vehicle to exchange data and/or to provide power), and one or more drive system(s) 514. The system 500 may additionally or alternatively comprise vehicle computing device(s) 504.

In some instances, the sensor(s) 506 may include lidar sensors, radar sensors, ultrasonic transducers, sonar sensors, location sensors (e.g., global positioning system (GPS), compass,), inertial sensors (e.g., inertial measurement units (IMUs), accelerometers, magnetometers, gyroscopes,), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors,), etc.

The vehicle 502 may also include emitter(s) 508 for emitting light and/or sound, as described above. The vehicle 502 may also include network interface(s) 510 that enable communication between the vehicle 502 and one or more other local or remote computing device(s). The network interface(s) 510 may include physical and/or logical interfaces for connecting the vehicle computing device(s) 504 to another computing device or a network, such as network(s) 538.

In some instances, the vehicle 502 may include one or more drive systems(s) 514 (or drive components). In some instances, the vehicle 502 may have a single drive system 514. In some instances, the drive system(s) 514 may include one or more sensors to detect conditions of the drive system(s) 514 and/or the surroundings of the vehicle 502. By way of example and not limitation, the sensor(s) of the drive systems(s) 514 may include one or more wheel encoders (e.g., rotary encoders) to sense rotation of the wheels of the drive components, inertial sensors (e.g., inertial measurement units, accelerometers, gyroscopes, magnetometers) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive system(s) 514. In some cases, the sensor(s) on the drive system(s) 514 may overlap or supplement corresponding systems of the vehicle 502 (e.g., sensor(s) 506).

The drive systems(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.).

The vehicle computing device(s) 504 may include processor(s) 516 and memory 518 communicatively coupled with the one or more processors 516. Computing device(s) 540 may also include processor(s) 542, and/or memory 544.

The processor(s) 516 and/or 542 may be any suitable processor capable of executing instructions (e.g., computer-executable instructions) to process data and perform operations as described herein. By way of example and not limitation, the processor(s) 516 and/or 542 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 518 and/or 544 may be examples of non-transitory computer-readable media. Memory 518 and/or 544 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, memory 518 and/or memory 544 may store a localization component 520, perception component 522, maps 524, system controller(s) 526, prediction component 528, proactive signaling component 532, and/or planning component 530.

In at least one example, the localization component 520 may include hardware and/or software to receive data from the sensor(s) 506 to determine a position, velocity, and/or orientation of the vehicle 502 (e.g., one or more of an x-, y-, z-position, roll, pitch, or yaw).

Memory 518 may further include one or more maps 524 that may be used by the vehicle 502 to navigate within the environment. For the purpose of this discussion, a map may be any number of data structures modeled in two dimensions, three dimensions, or N-dimensions that may provide information about an environment, such as, but not limited to, topologies (such as intersections), streets, mountain ranges, roads, terrain, and the environment in general. In one example, a map may include a three-dimensional mesh generated using the techniques discussed herein. In some instances, the map may be stored in a tiled format, such that individual tiles of the map represent a discrete portion of an environment and may be loaded into working memory as needed. In at least one example, the one or more maps 524 may include at least one map (e.g., images and/or a mesh) generated in accordance with the techniques discussed herein. In some examples, the vehicle 502 may be controlled based at least in part on the maps 524. That is, the maps 524 may be used in connection with the localization component 520, the perception component 522, and/or the planning component 530 to determine a location of the vehicle 502, identify objects in an environment, and/or generate routes and/or trajectories to navigate within an environment.

In some instances, the perception component 522 may comprise a primary perception system and/or a prediction system implemented in hardware and/or software. In some examples, sensor data and/or perception data may be used to generate an environment state that represents a current state of the environment. For example, the environment state may be a data structure that identifies object data (e.g., object position, area of environment occupied by object, object heading, object velocity, historical object data), environment layout data (e.g., a map or sensor-generated layout of the environment), environment condition data (e.g., the location and/or area associated with environmental features, such as standing water or ice, whether it's raining, visibility metric), sensor data (e.g., an image, point cloud), etc. In some examples, the environment state may include a top-down two-dimensional representation of the environment and/or a three-dimensional representation of the environment, either of which may be augmented with object data. In yet another example, the environment state may include sensor data alone. In yet another example, the environment state may include sensor data and perception data together.

Prediction component 528 may include functionality to generate predicted information associated with objects in an environment.

Planning component 530 may receive a location and/or orientation of the vehicle 502 from the localization component 520, perception data from the perception component 522, and/or predicted trajectories from the prediction component 528 and may determine instructions for controlling operation of the vehicle 502 based at least in part on any of this data.

Proactive signaling component 532 may determine whether to activate a blinker functionality associated with the vehicle. For example, the proactive signaling component 532 may be configured to determine whether to activate a blinker functionality associated with a right lane change maneuver and/or a left lane change maneuver.

Memory 518 and/or 544 may additionally or alternatively store a mapping system (e.g., generating a map based at least in part on sensor data), a planning system, a ride management system, etc. Although localization component 520, perception component 522, the prediction component 528, the planning component 530, and/or system controller(s) 526 are illustrated as being stored in memory 518, any of these components may include processor-executable instructions, machine-learned model(s) (e.g., a neural network), and/or hardware and all or part of any of these components may be stored on memory 544 or configured as part of computing device(s) 540.

As described herein, the localization component 520, the perception component 522, the prediction component 528, the planning component 530, and/or other components of the system 500 may comprise one or more ML models. For example, the localization component 520, the perception component 522, the prediction component 528, and/or the planning component 530 may each comprise different ML model pipelines. The prediction component 528 may use a different ML model or a combination of different ML models in different circumstances. For example, the prediction component 528 may use different GNNs, RNNs, CNNs, MLPs and/or other neural networks tailored to outputting predicted object trajectories in different seasons (e.g., summer or winter), different driving conditions and/or visibility conditions (e.g., times when border lines between road lanes may not be clear or may be covered by snow), and/or based on different crowd or traffic conditions (e.g., more conservative trajectories in a crowded traffic conditions such as downtown areas, etc.). In various examples, any or all the above ML models may comprise an attention mechanism, GNN, and/or any other neural network. An exemplary neural network is a biologically inspired algorithm which passes input data through a series of connected layers to produce an output. Each layer in a neural network may also comprise another neural network or may comprise any number of layers (whether convolutional or not). As may be understood in the context of this disclosure, a neural network may utilize machine-learning, which may refer to a broad class of such algorithms in which an output is generated based on learned parameters.

Although discussed in the context of neural networks, any type of machine-learning may be used consistent with this disclosure. For example, machine-learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like.

Memory 518 may additionally or alternatively store one or more system controller(s) 526, which may be configured to control steering, propulsion, braking, safety, emitters, communication, and other systems of the vehicle 502. These system controller(s) 526 may communicate with and/or control corresponding systems of the drive systems(s) 514 and/or other components of the vehicle 502.

In an additional or alternate example, vehicle 502 and/or computing device(s) 540 may communicate (e.g., transmit and/or receive messages over network(s) 538) with one or more passenger devices (not shown). A passenger device may include, for example, a smart phone, portable computer such as a laptop or tablet, wearable device (e.g., smart glasses, smart watch, earpiece), and/or the like. Although a passenger device may be a device associated with a passenger that is discrete from device(s) of the autonomous vehicle, it is contemplated that the passenger device may be a sub-system and/or a device of the vehicle 502. For example, the passenger device may additionally or alternatively comprise a display and/or one or more input/output devices, such as a touchscreen, microphone, speaker, and/or the like. In some examples, the vehicle 502 may transmit messages and/or receive messages from the passenger device.

It should be noted that while FIG. 5 is illustrated as a distributed system, in alternative examples, components of the vehicle 502 may be associated with the computing device(s) 540 and/or components of the computing device(s) 540 may be associated with the vehicle 502. That is, the vehicle 502 may perform one or more of the functions associated with the computing device(s) 540, and vice versa.

CONCLUSION

While one or more examples of the techniques described herein have been described, various alterations, additions, permutations, and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples. For example, the components and instructions of FIG. 5 may utilize the processes and flows of FIGS. 1-4.

A non-limiting list of objects may include obstacles in an environment, including but not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Example Clauses

While the example clauses described below are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

A: A system comprising: one or more processors; and one or more non-transitory computer-readable media storing computer-executable instructions that, when executed, cause the system to perform operations comprising: determining that a lane in which a vehicle is traversing through an environment is blocked; determining, based at least in part on the lane being blocked, to activate a blinker of the vehicle, the blinker indicating an intent of the vehicle to change lanes to a proximate lane; determining a cost based at least in part on a length of time the blinker of the vehicle has been activate; determining, based on the cost, a trajectory; and controlling the vehicle based on the trajectory.

B: The system of paragraph A, wherein determining that the lane is blocked comprises one or more of: determining that the lane ends, or determining that a blocking object is present in the lane.

C: The system of paragraph A or B, wherein the lane is a center lane and the proximate lane is one of a left lane left of the center lane or a right lane right of the center lane, the operations further comprising: determining a first cost associated with a first trajectory initialized in the left lane; determining a second cost associated with a second trajectory initialized in the right lane; and determining, based at least in part on the first cost and the second cost, a side of the vehicle to activate the blinker, wherein the blinker is associated with the side.

D: The system of any of paragraphs A-C, wherein determining the cost comprises: sampling a first representation associated with the trajectory from a first distribution; determining the cost based on the first representation; determining a second distribution based on the first distribution and the cost; and sampling a second representation associated with a second trajectory from the second distribution.

E: The system of any of paragraphs A-D, wherein determining the cost comprises: determining a tree structure based on a set of proposed actions for the vehicle to take to traverse an environment, wherein a branch of the tree structure comprises a node and is associated with a lane change; and determining the cost based on a segment of the tree structure that comprises the node.

F: One or more non-transitory computer-readable media storing instructions executable by one or more processors, wherein the instructions, when executed, cause the one or more processors to perform operations comprising: determining a cost associated with a trajectory based at least in part on a length of time a blinker of a vehicle has been activated prior to performing a lateral movement; determining, based on the cost, a trajectory; and controlling the vehicle based on the trajectory.

G: The one or more non-transitory computer-readable media of paragraph F, wherein the cost represents that the blinker was inactive for a period prior to performing the lateral movement.

H: The one or more non-transitory computer-readable media of paragraph F or G, the operations further comprising: determining a first cost associated with a first trajectory initialized in a left lane; determining a second cost associated with a second trajectory initialized in a right lane; and determining, based at least in part on the first cost and the second cost, a side of the vehicle to activate the blinker.

I: The one or more non-transitory computer-readable media of any of paragraphs F-H, wherein the operations further comprise: determining that the vehicle is in a lane that comprises at least one of a lane ending or a blocking object; and activating the blinker based at least in part on the lane comprising at least one of the lane ending or the blocking object.

J: The one or more non-transitory computer-readable media of any of paragraphs F-I, the operations further comprising: updating the cost based on determining that the vehicle is in a second lane.

K: The one or more non-transitory computer-readable media of any of paragraphs F-J, the operations further comprising: determining to activate the blinker based on a second cost associated with a relative distance between the vehicle and an object proximate the vehicle.

L: The one or more non-transitory computer-readable media of paragraph K, wherein determining the second cost comprises: sampling a first representation associated with the trajectory from a first distribution; determining the second cost based on the first representation; determining a second distribution based on the first distribution and the second cost; and sampling a second representation from the second distribution.

M: The one or more non-transitory computer-readable media of paragraph K or L, wherein determining the second cost comprises: determining a tree structure based on a set of proposed actions for the vehicle to take to traverse an environment, wherein a branch of the tree structure comprises a node and is associated with the lateral movement; and determining the cost based on a segment of the tree structure that comprises the node.

N: The one or more non-transitory computer-readable media of any of paragraphs F-M, wherein the cost represents that the blinker was activated for a different purpose other than to signal the lateral movement.

O: A method comprising: determining a cost associated with a first trajectory based at least in part on a length of time a blinker of a vehicle has been activated prior to performing a first lateral movement; determining, based on the cost, a trajectory; and controlling the vehicle based on the trajectory.

P: The method of paragraph O, wherein the cost represents that the blinker was inactive for a period prior to performing the first lateral movement.

Q: The method of paragraph O or P, wherein the cost represents that the blinker was activated for a different purpose other than to signal the first lateral movement.

R: The method of any of paragraphs O-Q, wherein determining the cost comprises: determining that the vehicle is in a lane that comprises at least one of a lane ending or a blocking object.

S: The method of paragraph R, further comprising: updating the cost based on determining that the vehicle is in a second lane.

T: The method of any of paragraphs O-S, further comprising: determining the trajectory based on a second cost associated with a relative distance between the vehicle and an object proximate the vehicle.

What is claimed is:

1. A system comprising:
- one or more processors; and
- one or more non-transitory computer-readable media storing computer-executable instructions that, when executed, cause the system to perform operations comprising:
  - determining that a lane in which a vehicle is traversing through an environment is blocked;
  - determining a first set of costs associated with activating a blinker of the vehicle;
  - determining, based at least in part on the lane being blocked and the first set of costs, to activate the blinker, the blinker indicating an intent of the vehicle to change lanes to a proximate lane;
  - determining a second set of costs associated with a trajectory comprising a lane change maneuver, wherein the second set of costs is distinct from the first set of costs and comprises a cost determined based at least in part on a length of time the blinker of the vehicle has been activated;
  - determining, based on the second set of costs, to control the vehicle in accordance with a second trajectory that excludes the lane change maneuver; and
  - controlling the vehicle based on the second trajectory.

2. The system of claim 1, wherein determining that the lane is blocked comprises one or more of:
- determining that the lane ends, or
- determining that a blocking object is present in the lane.

3. The system of claim 1, wherein the lane is a center lane and the proximate lane is one of a left lane left of the center lane or a right lane that is to a right of the center lane, the operations further comprising:
- determining a first cost associated with a third trajectory initialized in the left lane;
- determining a second cost associated with a fourth trajectory initialized in the right lane; and
- determining, based at least in part on the first cost and the second cost, a side of the vehicle to activate the blinker,
- wherein the blinker is associated with the side.

4. The system of claim 1, wherein determining the cost comprises:
- sampling a first representation associated with the trajectory from a first distribution;
- determining the cost based on the first representation;
- determining a second distribution based on the first distribution and the cost; and
- sampling a second representation associated with a third trajectory from the second distribution.

5. The system of claim 1, wherein determining the cost comprises:
- determining a tree structure based on a set of proposed actions for the vehicle to take to traverse the environment, wherein a branch of the tree structure comprises a node and is associated with a lane change; and
- determining the cost based on a segment of the tree structure that comprises the node.

6. One or more non-transitory computer-readable media storing instructions executable by one or more processors, wherein the instructions, when executed, cause the one or more processors to perform operations comprising:
- determining a first set of costs associated with activating a blinker of a vehicle;
- determining, based at least in part on the first set of costs, to activate the blinker;
- determining a second set of costs associated with a trajectory comprising a lane change maneuver, wherein the second set of costs is distinct from the first set of costs and comprises a cost determined based at least in part on a length of time the blinker has been activated;
- determining, based on the second set of costs, to control the vehicle in accordance with a second trajectory that excludes the lane change maneuver; and
- controlling the vehicle based on the second trajectory.

7. The one or more non-transitory computer-readable media of claim 6, wherein the cost represents that the blinker was inactive for a period prior to performing the lane change maneuver.

8. The one or more non-transitory computer-readable media of claim 6, the operations further comprising:
- determining a first cost associated with a first trajectory initialized in a left lane;
- determining a second cost associated with a third trajectory initialized in a right lane; and
- determining, based at least in part on the first cost and the second cost, a side of the vehicle to activate the blinker.

9. The one or more non-transitory computer-readable media of claim 6, wherein the operations further comprise:

determining that the vehicle is in a lane that comprises at least one of a lane ending or a blocking object; and activating the blinker based at least in part on the lane comprising at least one of the lane ending or the blocking object.

10. The one or more non-transitory computer-readable media of claim 6, the operations further comprising:

updating the cost based on determining that the vehicle is in a second lane.

11. The one or more non-transitory computer-readable media of claim 6, the operations further comprising:

determining to activate the blinker based on a second cost associated with a relative distance between the vehicle and an object proximate the vehicle.

12. The one or more non-transitory computer-readable media of claim 11, wherein determining the second cost comprises:

sampling a first representation associated with the trajectory from a first distribution;

determining the second cost based on the first representation;

determining a second distribution based on the first distribution and the second cost; and sampling a second representation from the second distribution.

13. The one or more non-transitory computer-readable media of claim 11, wherein determining the second cost comprises:

determining a tree structure based on a set of proposed actions for the vehicle to take to traverse an environment, wherein a branch of the tree structure comprises a node and is associated with the lane change maneuver; and determining the cost based on a segment of the tree structure that comprises the node.

14. The one or more non-transitory computer-readable media of claim 6, wherein the cost is determined based on whether the blinker was activated to signal an intention to perform the lane change maneuver.

15. A method comprising:

determining a first set of costs associated with activating a blinker of a vehicle;

determining, based at least in part on the first set of costs, to activate the blinker;

determining a second set of costs associated with a trajectory comprising a lane change maneuver, wherein the second set of costs is distinct from the first set of costs and comprises a cost determined based at least in part on a length of time the blinker has been activated;

determining, based on the second set of costs, to control the vehicle in accordance with a second trajectory that excludes the lane change maneuver; and controlling the vehicle based on the second trajectory.

16. The method of claim 15, wherein the cost represents that the blinker was inactive for a period prior to performing the lane change maneuver.

17. The method of claim 15, wherein the cost is determined based on whether the blinker was activated to signal an intention to perform the lane change maneuver.

18. The method of claim 15, wherein determining the cost comprises:

determining that the vehicle is in a lane that comprises at least one of a lane ending or a blocking object.

19. The method of claim 18, further comprising:

updating the cost based on determining that the vehicle is in a second lane.

20. The method of claim 15, further comprising:

determining the trajectory based on a second cost associated with a relative distance between the vehicle and an object proximate the vehicle.

* * * * *